United States Patent
Mizobuchi et al.

(10) Patent No.: US 12,205,196 B2
(45) Date of Patent: Jan. 21, 2025

(54) METHOD AND APPARATUS FOR VIDEO CONFERENCING

(71) Applicant: HUAWEI TECHNOLOGIES CO., LTD., Guangdong (CN)

(72) Inventors: Sachi Mizobuchi, Markham (CA); Xuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 17/847,689

(22) Filed: Jun. 23, 2022

(65) Prior Publication Data

US 2022/0319063 A1 Oct. 6, 2022

Related U.S. Application Data

(63) Continuation of application No. PCT/CN2020/102492, filed on Jul. 16, 2020.

(51) Int. Cl.
*G06T 11/00* (2006.01)
*G06V 20/40* (2022.01)
(Continued)

(52) U.S. Cl.
CPC .............. *G06T 11/00* (2013.01); *G06V 20/40* (2022.01); *G06V 40/174* (2022.01); *G06V 40/20* (2022.01); *H04L 65/403* (2013.01)

(58) Field of Classification Search
None
See application file for complete search history.

(56) References Cited

U.S. PATENT DOCUMENTS

| 2010/0207874 A1* | 8/2010 | Yuxin | G06Q 30/02 |
| | | | 345/156 |
| 2011/0029893 A1* | 2/2011 | Roberts | G06Q 10/10 |
| | | | 715/753 |

(Continued)

FOREIGN PATENT DOCUMENTS

| CN | 103607556 A | 2/2014 |
| CN | 104349111 A | 2/2015 |

(Continued)

OTHER PUBLICATIONS

International Search Report of PCT/CN2020/102492; ISA/CN; Jia Meng; Apr. 19, 2021.

(Continued)

*Primary Examiner* — Duc Nguyen
*Assistant Examiner* — Assad Mohammed
(74) *Attorney, Agent, or Firm* — BCF LLP

(57) ABSTRACT

The present disclosure relates to a video conferencing system which provides non-obtrusive feedback to a presenter during a video conference to improve interactivity among participants of video conference. An image sensor, such as a camera, captures a sequence of images (i.e., a video) of the participant while a participant of the video conference is moving their port or a part of their body and sends the images to video conferencing server. The video conferencing server processes the images to recognize a type of gesture performed by the participant and selects an ambient graphic that corresponds to the recognized gesture. The video conferencing server sends the ambient graphic to a client device associated with the presenter. The client device associated with the presenter renders or displays the ambient graphic on a display screen of the client device without obscuring information displayed on the display screen of the client device.

16 Claims, 8 Drawing Sheets

(51) Int. Cl.
    *G06V 40/16*    (2022.01)
    *G06V 40/20*    (2022.01)
    *H04L 65/403*   (2022.01)

(56) References Cited

U.S. PATENT DOCUMENTS

| | | | |
|---|---|---|---|
| 2013/0019187 A1* | 1/2013 | Hind | H04L 65/4025 |
| | | | 715/753 |
| 2014/0270388 A1* | 9/2014 | Lucey | G06V 20/30 |
| | | | 382/107 |
| 2017/0310927 A1* | 10/2017 | West | G06T 13/80 |
| 2018/0063482 A1* | 3/2018 | Goesnar | H04N 23/58 |
| 2019/0373216 A1 | 12/2019 | Cutler et al. | |
| 2020/0099890 A1* | 3/2020 | Tanaka | G06F 13/14 |
| 2020/0184203 A1* | 6/2020 | Anders | G06N 7/00 |
| 2020/0312331 A1* | 10/2020 | Gustafson | G06F 3/017 |
| 2020/0349429 A1* | 11/2020 | Vendrow | H04N 7/15 |

FOREIGN PATENT DOCUMENTS

| | | |
|---|---|---|
| CN | 106548517 A | 3/2017 |
| CN | 108881784 A | 11/2018 |
| WO | 2018214746 A1 | 11/2018 |

OTHER PUBLICATIONS

Shami et al., Enhancing distributed corporate meetings with lightweight avatars, Apr. 14-15, 2010, In CHI'10 Extended Abstracts on Human Factors in Computing Systems, Atlanta, USA, pp. 3829-3834.

\* cited by examiner

METHOD AND APPARATUS FOR VIDEO CONFERENCING

CROSS-REFERENCE TO RELATED APPLICATIONS

This application claims priority to previously-filed PCT Application No. PCT/CN2020/102492 entitled "METHOD AND APPARATUS FOR VIDEO CONFERENCING," filed on Jul. 16, 2020, the contents of which is incorporated herein by reference.

FIELD OF THE INVENTION

The present invention generally relates to video conferencing and, in particular, to a system, method, and computing device for video conferencing.

BACKGROUND

Video conferencing systems are often used for real-time audio and video communications between multiple client devices located at various different locations. A video conferencing system enables a presenter, using a client device, to interact with and share information with participants of an online workshop, presentation, webinar, or meeting located at various different locations.

When a presenter uses a video conferencing system for conducting an online workshop, presentation, webinar or meeting (hereinafter referred to as a video conference), a microphone may capture the presenter's speech during the video conference and generate audio signals representative of the presenter's speech. A camera may capture a digital video of the presenter and send the digital video of the presenter for display, for example in a window of a graphical user interface, on a display screen may be used to display the digital video. The audio signals representative of the captured speech, the video showing the presenter speaking are transmitted to other computing devices used by participants of the video conference, together with information that is to be shared with participants of the video conference. The devices associated with (e.g. used by) participants of the video conference may receive the audio signals representative of the captured speech and output the speech using a speaker of their device. The devices associated the participants may also receive the video of the presenter captured by a camera, and the information shared by the presenter and display both on a display screen of the electronic devices or an external display screen connected to the electronic devices.

Information is often displayed on a display screen in full-screen mode. Moreover, participants often mute microphones of their electronic devices used while listening to a presenter's speech and view information displayed on the display screen of their electronic device. This makes it difficult for the participants to interrupt the presenter in a timely manner.

If the presenter display does not provide any sign of participants' willingness to intervene, the presenter continues talking. In order to capture a comment or a question of a participant, a microphone of the participant electronic device needs to be unmuted manually by the participant. Such intervention cuts the speech and interrupts a natural flow of the presentation.

Currently available video conferencing systems for video communication may display a video captured by a camera of each electronic device used by a participant in real time on a display screen of the display their computing device. Numerous live videos or avatars of the participants obscure hide the original video material displayed on the display screen of the electronic display. Moreover, in order to timely identify when one or more participants may want to intervene, the presenter needs to constantly observe the live videos of all participants.

SUMMARY

The present disclosure generally provides a video conferencing system that provides non-obtrusive feedback to a presenter during a video conference to improve interactivity among participants of video conference. When a participant of the video conference wishes to capture the attention of the presenter of the video conference, the participant moves a part of their body (or their entire body). An image sensor, such as a camera, captures a sequence of images (i.e., a video) of the participant while the participant is moving their body (or moving a part of their body) and sends the sequence of images to video conferencing server. The video conferencing server processes the sequence of images using computer-vision techniques to recognize the type of a facial expression or body movement in the sequence of images and select a notification that corresponds to the recognized facial expression or body movement. The video conferencing server sends an ambient graphic to a client device associated with the presenter. The client device associated with the presenter displays the ambient graphic on a display screen of the client device without obscuring information displayed on the display screen of the client device. The ambient can been seen by the presenter without disturbing the presenter during the video conference.

In accordance with an aspect of the present disclosure, there is provided a video conferencing server comprising: a processor, and a non-transitory storage medium storing instructions executable by the processor to: receive participant video information from a participant client device; perform object recognition on the participant video information received from the participant client device to recognize a facial expression or body movement of each participant detected in the participant video information; select an ambient graphic based on the facial expression or body movement detected for each participant detected in the participant video information; and transmit the selected ambient graphic to a presenter display associated with a presenter client device for rendering the ambient graphic over at least a portion of a current content being displayed on the presenter display associated with the presenter client device without obscuring the current content.

In accordance with other aspects of the present disclosure, the video conferencing server further comprises transmitting the selected ambient graphic to a participant display associated with the participant client device for displaying the ambient graphic over at least a portion of a current content being displayed on the participant display associated with the participant client device.

In accordance with other aspects of the present disclosure, the video conferencing server further comprises: receiving participant video information from a second participant client device; performing object recognition on the participant video information received from the second participant client device to recognize a facial expression or body movement of each participant detected in the participant video information; selecting an ambient graphic based on the facial expression or body movement detected for each participant detected in the participant video information; and transmitting the selected ambient graphic to the presenter display associated with the presenter client device for rendering the ambient graphic over at least a portion of the current content being displayed on the presenter display associated with the presenter client device without obscuring the current content.

In accordance with other aspects of the present disclosure, the video conferencing server further comprises transmitting the selected ambient graphic to a participant display associated with the second participant client device for displaying the ambient graphic over at least a portion of a current content being displayed on the participant display associated with the second participant client device.

In accordance with other aspects of the present disclosure, the video conferencing server, wherein the ambient graphic is semitransparent In accordance with other aspects of the present disclosure, the video conferencing server, wherein the participant information includes audio and video information associated with at least one participant.

In accordance with other aspects of the present disclosure, the video conferencing server, wherein the video information is captured by an image sensor and the audio information is captured by a microphone.

In accordance with other aspects of the present disclosure, the video conferencing server, wherein the facial expression includes at least one of a laughing, smiling or nodding and the body movement includes at least one of a head nodding, head tilting, raising hands, waving hands, pointing hands or applauding.

In accordance with other aspects of the present disclosure, the video conferencing server, wherein selecting the ambient graphic further includes generating the ambient graphic.

In accordance with other aspects of the present disclosure, the video conferencing server further comprises determining number of similar facial expressions with one or more participants in the participant video information.

In accordance with other aspects of the present disclosure, the video conferencing server further comprises selecting the ambient graphic based on the number of similar facial expressions associated the one or more participants in the participant video information.

In accordance with other aspects of the present disclosure, the video conferencing server further comprises computing a number of similar type of body movements.

In accordance with other aspects of the present disclosure, the video conferencing server, wherein the ambient graphic is selected based on the number of similar type of body movements associated the one or more participants in the participant video information.

In accordance with other aspects of the present disclosure, the video conferencing server, wherein the current content includes at least one of a digital document stored on the presenter client device or a digital document accessed online.

In accordance with another aspects of the present disclosure, there is provided a method comprising: receiving participant video information from a participant client device; performing object recognition on the participant video information received from the participant client device to recognize a facial expression or body movement of each participant detected in the participant video information; selecting an ambient graphic based on the facial expression or body movement detected for each participant detected in the participant video information; and transmitting the selected ambient graphic to a presenter display associated with a presenter client device for rendering the ambient graphic over at least a portion of a current content being displayed on the presenter display associated with the presenter client device without obscuring the current content.

In accordance with other aspects of the present disclosure, the method further transmitting the selected ambient graphic to a participant display associated with the participant client device for displaying the ambient graphic over at least a portion of a current content being displayed on the participant display associated with the participant client device.

In accordance with other aspects of the present disclosure, the method further comprises: receiving participant video information from a second participant client device; performing object recognition on the participant video information received from the second participant client device to recognize a facial expression or body movement of each participant detected in the participant video information; selecting an ambient graphic based on the facial expression or body movement detected for each participant detected in the participant video information; and transmitting the selected ambient graphic to the presenter display associated with the presenter client device for rendering the ambient graphic over at least a portion of the current content being displayed on the presenter display associated with the presenter client device without obscuring the current content.

In accordance with other aspects of the present disclosure, the method further comprises transmitting the selected ambient graphic to a participant display associated with the second participant client device for displaying the ambient graphic over at least a portion of a current content being displayed on the participant display associated with the second participant client device.

In accordance with other aspects of the present disclosure, the method, wherein the ambient graphic is semitransparent.

In accordance with other aspects of the present disclosure, the method, wherein the participant information includes audio and video information associated with at least one participant.

In accordance with other aspects of the present disclosure, the method, wherein the video information is captured by an image sensor and the audio information is captured by a microphone.

In accordance with other aspects of the present disclosure, the method, wherein the facial expression includes at least one of a laughing, smiling or nodding and the body movement includes at least one of a head nodding, head tilting, raising hands, waving hands, pointing hands or applauding.

In accordance with other aspects of the present disclosure, the method, wherein selecting the ambient graphic further includes generating the ambient graphic.

In accordance with other aspects of the present disclosure, the method further comprises determining number of similar facial expressions with one or more participants in the participant video information.

In accordance with other aspects of the present disclosure, the method further comprises selecting the ambient graphic based on the number of similar facial expressions associated the one or more participants in the participant video information.

In accordance with other aspects of the present disclosure, the method further comprises computing a number of similar type of body movements.

In accordance with other aspects of the present disclosure, the method, wherein the ambient graphic is selected based on the number of similar type of body movements associated the one or more participants in the participant video information.

In accordance with other aspects of the present disclosure, the method, wherein the current content includes at least one of a digital document stored on the presenter client device or a digital document accessed online.

In accordance with another aspects of the present disclosure, there is provided a computer-readable storage medium, comprising executable instructions that, when executed by a processor comprising: receiving participant video information from a participant client device; performing object recognition on the participant video information received from the participant client device to recognize a facial expression or body movement performed by each participant detected in the participant video information; selecting an ambient graphic based on the facial expression or body movement detected for each participant detected in the participant video information; and transmitting the selected ambient graphic to a presenter display associated with a presenter client device for rendering the ambient graphic over at least a portion of a current content being displayed on the presenter display associated with the presenter client device without obscuring the current content.

In accordance with another aspects of the present disclosure, there is provided a video conferencing system comprising: at least one participant client device, the at least one participant client device configured to: receive participant video information associated with participants; perform object recognition on the participant video information to recognize a facial expression or body movement of each participant detected in the participant video information; transmitting the detected facial expression or body movement detected for each participant in the participant video information to a video conferencing server; the video conferencing server configured to: select an ambient graphic based on the facial expression or body movement received for each participant detected in the participant video information; and transmit the selected ambient graphic to a presenter display associated with a presenter client device for rendering the ambient graphic over at least a portion of a current content being displayed on the presenter display associated with the presenter client device without obscuring the current content.

In accordance with another aspects of the present disclosure, there is provided a video conferencing system comprising: at least one participant client device, the at least one participant client device includes: an image sensor, the image sensor configured to capture participant video information; the at least one participant client device transmits the participant video information to a video conferencing server; the video conferencing server configured to: receive participant video information from the at least one participant client device; perform object recognition on the participant video information received from the at least one participant client device to recognize a facial expression or body movement of each participant detected in the participant video information; select an ambient graphic based on the facial expression or body movement detected for each participant detected in the participant video information; and transmit the selected ambient graphic to a presenter display associated with a presenter client device for rendering the ambient graphic over at least a portion of a current content being displayed on the presenter display associated with the presenter client device without obscuring the current content.

BRIEF DESCRIPTION OF THE FIGURES

Further features and advantages of the present disclosure will become apparent from the following detailed description, taken in combination with the appended drawings, in which.

Figure 1:
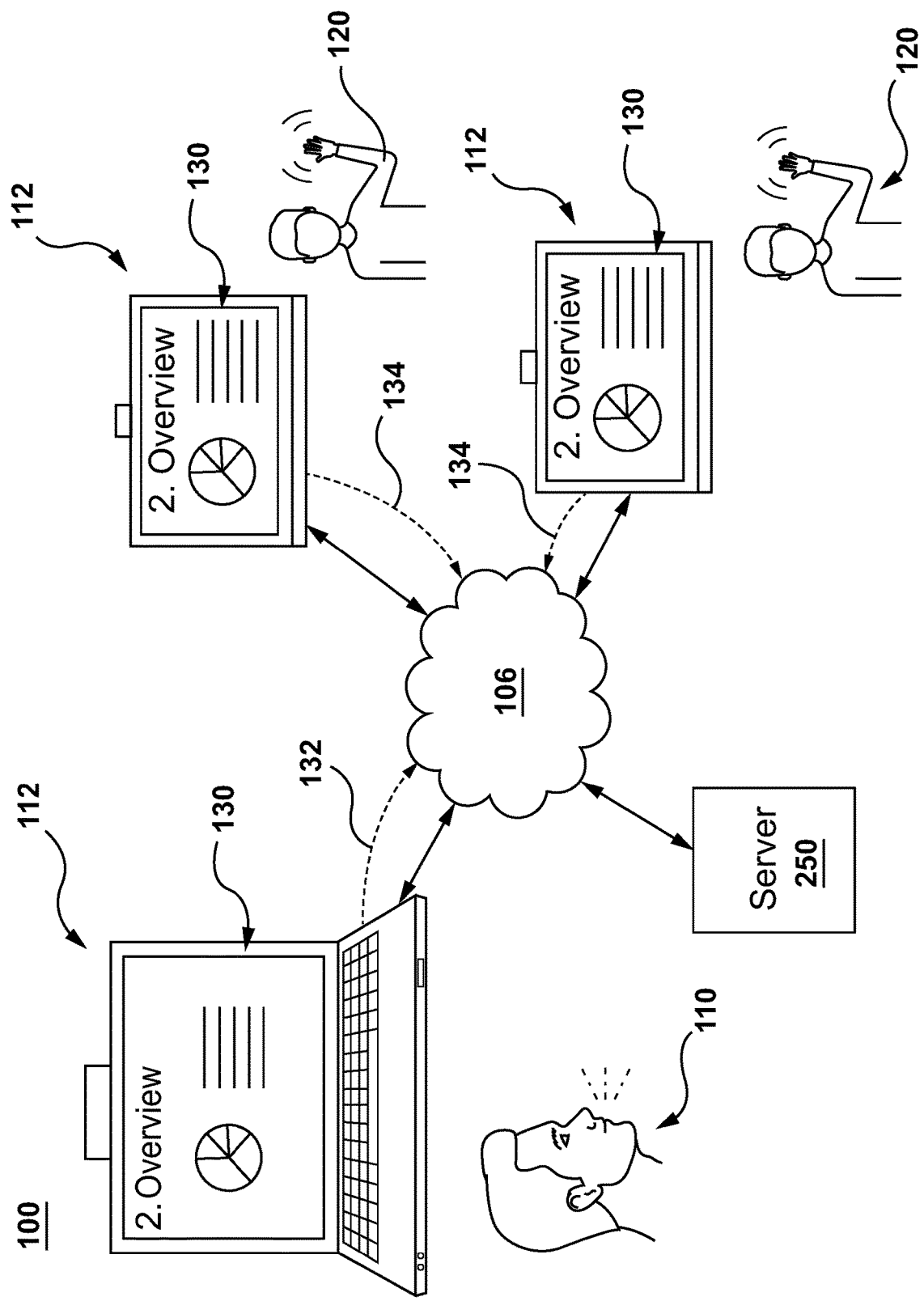
FIG. 1 depicts a video conferencing system for providing audio and video communications, suitable for implementing various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for video conferencing.

In the context of the present specification, a "server" is a physical machine, a virtual machine, or computer program (e.g. software) running on appropriate physical or virtual machine, and is capable of receiving requests from "clients", and carrying out those requests, or causing those requests to be carried out. The physical machine may be one physical computer or one physical computer system, but neither is required to be the case with respect to the present technology. A virtual machine is a virtual representation of one physical machine or one physical computer system. In the present context, the use of the expression a "server" is not intended to mean that every task (e.g. received instructions or requests) or any particular task will have been received, carried out, or caused to be carried out, by the same server (i.e. the same software and/or machine); it is intended to mean that any number of software modules, routines or functions, or hardware devices may be involved in receiving/sending, carrying out or causing to be carried out any task or request, or the consequences of any task or request; and all of this software and hardware may be one server or multiple servers, both of which are included within the expression "one server".

In the context of the present specification, "client device" is any computer that is capable of running software (e.g. a client application or program) that accesses the. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "information" includes information of any nature or kind. Thus information includes, but is not limited to audiovisual works (images, movies, sound records, presentations, etc.), data (location data, numerical data, etc.), text (opinions, comments, questions, messages, etc.), documents, spreadsheets, etc.

In the context of the present specification, the expression "document" is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as JavaScript, etc.). A page may correspond to a document or a portion of a document. Therefore, the words "page" and "document" may be used interchangeably in some cases. In other cases, a page may refer to a portion of a document, such as a sub-document. It may also be possible for a page to correspond to more than a single document.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU), a tensor processor unit (TPU), a neural processing unit (NPU). Moreover, explicit use of the term "processor" should not be construed to refer exclusively to hardware capable of executing software, and may implicitly include, without limitation, an arithmetic and logic unit, a control unit, and a memory unit for storing instructions, data, and intermediate results, and a hardware accelerator in the form of an application specific-integrated circuit or field programmable gate array configured to perform hardware acceleration. Other hardware, conventional and/or custom, may also be included.

Software modules, or simply modules which are implied to be software, may be represented herein as any combination of flowchart elements or other elements indicating performance of process steps and/or textual description.

Such modules may be executed by hardware that is expressly or implicitly shown.

With these fundamentals in place, the instant disclosure is directed to address at least some of the deficiencies of the current technology. In particular, the instant disclosure describes a system and method for video conferencing.

The instant disclosure is directed to address at least some of the deficiencies of the current technology. In particular, the instant disclosure describes a system and method for video conferencing.

FIG. 1 depicts a video conferencing system 100 for real-time audio and video communications in accordance with an embodiment of the present disclosure. The video conferencing system 100 includes multiple client devices 112 located and different geographic locations that are configured to communicate with each other via a communication network 106 and a video conferencing server 250. The multiple client devices 112 include a first client device 112 associated with (e.g., used by) a host (i.e., presenter 110) of the video conference, a second client device 112 associated with (e.g. used by) a first participant 120 of the video conference and a third client device 112 associated with (e.g. used by) a second participant 120 of the video conference. The video conferencing system 100 may also include peripheral equipment (not shown), such as speakers, microphones, cameras, and display devices, located at different geographic locations that can communicate with the video conferencing server 250 via the communication network 106. Although FIG. 1 shows two client devices 112 each associated with one participant 120, it will be appreciated that in alternative embodiments, the video conferencing system 100 may include any number of client devices 112. Also, in other alternative embodiments, a client device 112 may be associated with multiple participants 120.

Figure 2A:
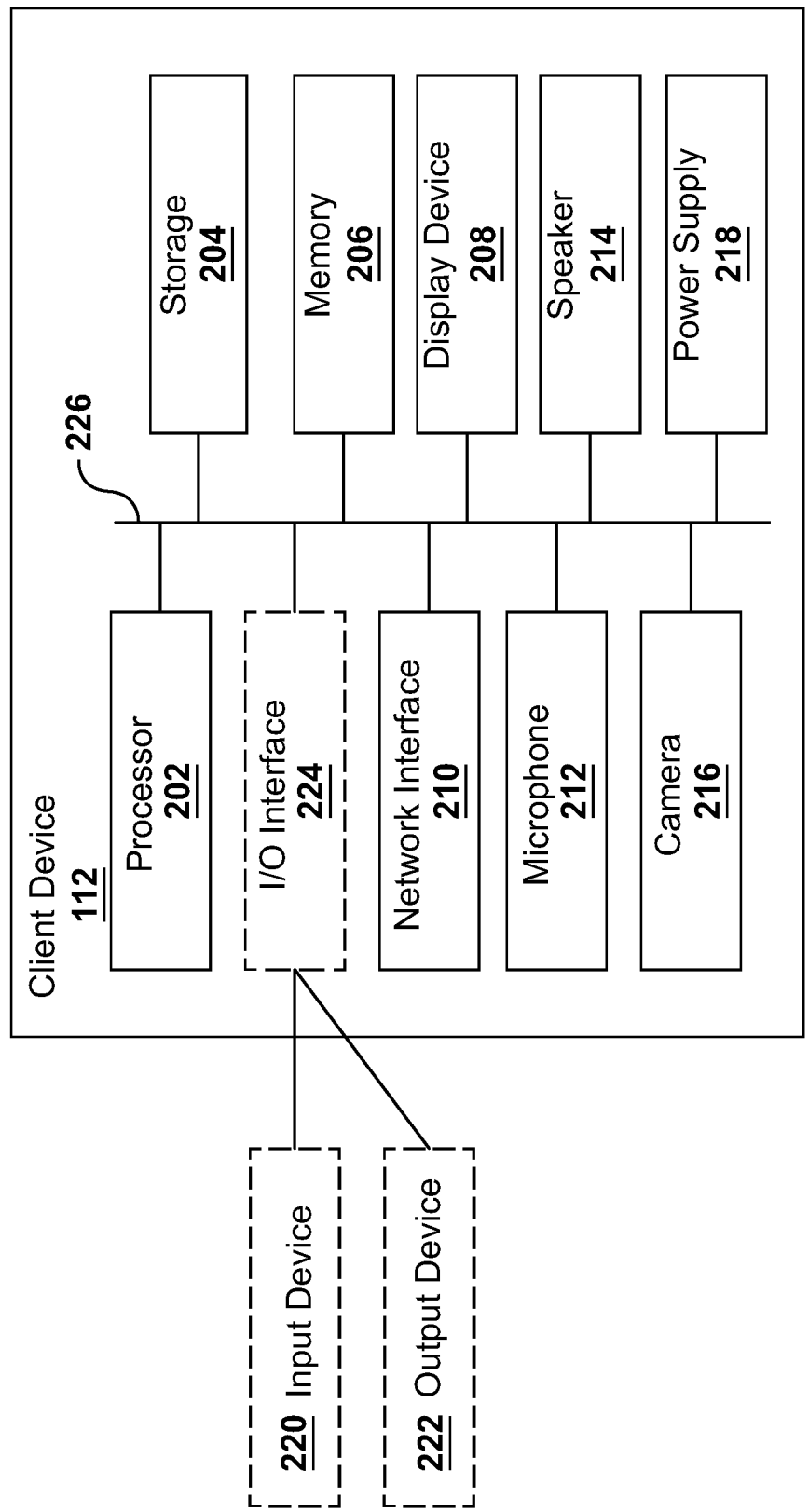
FIG. 2A depict a block diagram of a client device of the video conferencing system of FIG. 1 in accordance with various embodiments of the present disclosure.

FIG. 2A depicts a block diagram of a client device 112 in accordance with an embodiment of the present disclosure. The client device 112 may be any suitable type of computing device, including desktop computer, laptop computer, tablet, smartphone, portable electronic device, mobile computing device, personal digital assistance, smartwatch, e-reader, internet-enable application, and the like. The client device 112 multiple components, including a processor 202 that controls the overall operation of the client device 112. The processor 202 is coupled to and interacts with other components of the client device 112, including one or more storage units 204, one or more memories 206, a display device 208 (hereinafter referred to as display 208), a network interface 210, a microphone 212, and a speaker 214, and camera 216 (interchangeably used with image sensor 216). The client device 112 also includes a power supply 218 that powers the components of the client device 112, including the memory 206, the display 208, the network interface 210, the microphone 212, the speaker 214, and the camera 216. The power supply 218 may include a battery, a power pack, micro fuel cells and like, however, in other embodiments, the power supply 218 may include a port (not shown) to an external power supply and a power adaptor (not shown), such as an alternating current to direct current (AC-to-DC) adopter that provides power to components of the client device 112. Optionally, the client device 112 includes one or more input devices 220, one or more output devices 222 and an I/O interface 222.

The processor 202 of the client device 112 may include one or more of a central processing unit (CPU), an accelerator, a microprocessor, a graphics processing unit (GPU), a tensor processing unit (TPU), a neural processing unit (NPU), an application-specific integrated circuit (ASIC), a field-programmable gate array (FPGA), a dedicated logic circuitry, a dedicated artificial intelligence processor unit, or combinations thereof.

The processor 202 is configured to communicate with the storage unit 204, which may include a mass storage unit such as a solid state drive, a hard disk drive, a magnetic disk drive and/or an optical disk drive. The processor 202 is also configured to communicate with the memory(ies) 206, which may include volatile memory (e.g. random access memory (RAM)) and non-volatile or non-transitory memory (e.g., a flash memory, magnetic storage, and/or a read-only memory (ROM)). The non-transitory memory(ies) store applications or programs that include software instructions for execution by the processor 202, such as to carry out examples described in the present disclosure. The non-transitory memory store a video conferencing application as described in further detail below. Examples of non-transitory computer readable media include a RAM, a ROM, an erasable programmable ROM (EPROM), an electrically erasable programmable ROM (EEPROM), a flash memory, a CD-ROM, or other portable memory storage.

The processor 202 is also configured to communicate with the display 208, which includes any one of flat panel display (e.g. liquid crystal display, a plasma display, a light emitting diode (LED) display, an organic light emitting diode display (OLED)), touchscreen display such as a capacitive, resistance, surface acoustic wave (SAW) or optical touchscreen display, and the like.

The processor 202 is further configured to interact with the network interface 210. The network interface 210 may include one or more radios configured for wireless communications (e.g. cellular or WiFi communications) with the communication network 106, or one or more network adaptors configured for wired communications with the communication network 106. In general, the network interface 210 is configured to correspond with the network architecture of that is used to implement a link for communications between the client device 112 and the communication network 106. The communication network 106 may be internet, local area network, wide area network or the like.

The processor 202 is further configured to interact with the microphone 212, the speaker 214, and the camera 216. The microphone 210 includes any suitable transducer that converts sound to audio signals and provide the audio signals to the processor 202 for processing and/or transmission to other client devices 112. The speaker 214 includes any suitable transducer receives audio signal from the processor 202 and converts an audio signal received from the processor 202 into sound waves. The camera 216 is configured to captures video (e.g. a sequence of digital images) in a field of view of the camera 216 and provide the captured video to the processor 202 for processing. The camera 216 may be any suitable digital camera, such as a high definition image camera, an infrared camera, a stereo camera and the like. In some embodiments, the microphone 210, the speaker 214, and the camera 216 may be internally integrated to the client device 212. In other embodiments, the microphone 210, the speaker 214, and the camera 216 may be coupled external to the client device 112.

Optionally, the processor 202 may communicate with an input/output (I/O) interfaces 222, which may enable interfacing the one or more input devices 220 (e.g., a keyboard, a mouse, a joystick, trackball, fingerprint detector and the like) and/or output devices 222 (e.g., a printer, peripheral display device, and the like).

The client device 112 also includes a bus 226 providing communication among the components of the client device 112, including the processor 202, the memory 206, the display 208, the network interface 210, the microphone 212, the speaker 212, and the camera 214. The bus 226 may be any suitable bus architecture including, for example, a memory bus, a peripheral bus or a video bus.

Figure 2B:
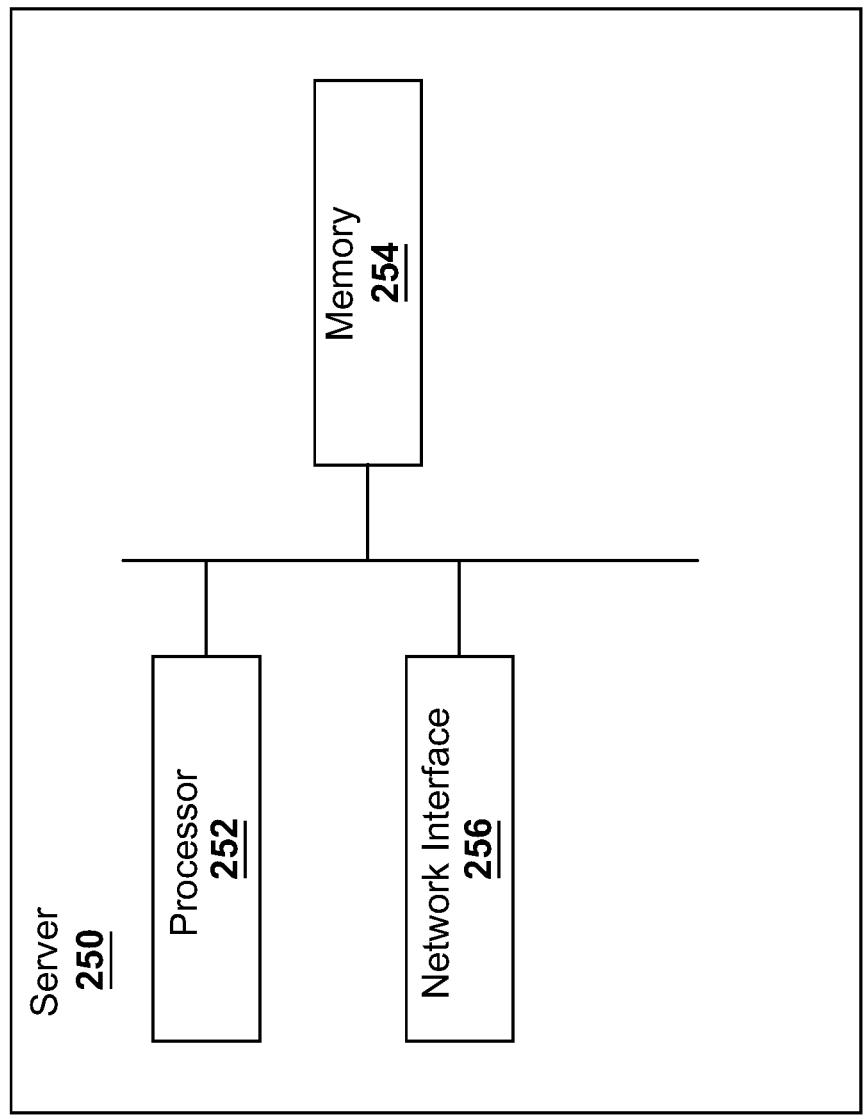
FIG. 2B depicts a block diagram of a video conferencing server of the video conferencing system of FIG. 1 in accordance with various embodiments of the present disclosure.

FIG. 2B depicts a block diagram of the video conferencing server 250 in accordance with an embodiment of the present disclosure. In this embodiment, the video conferencing server is a physical machine (e.g. a physical server) or virtual machine (e.g. a virtual server) that executes video conferencing system software to enable the client devices 112 to participate in a video conference. The video conferencing server 250 includes a processor 252, a memory 254, and a network interface 256.

The processor 252 of the video conferencing server 250 may include one or more of a central processing unit (CPU), an accelerator, a microprocessor, a graphics processing unit (GPU), an application-specific integrated circuit (ASIC), a field-programmable gate array (FPGA), a dedicated logic circuitry, a dedicated artificial intelligence processor unit, or combinations thereof.

The memory 254 may include volatile memory (e.g. random access memory (RAM)) and non-volatile or non-transitory memory (e.g., a flash memory, magnetic storage, and/or a read-only memory (ROM)). The non-transitory memory(ies) stores a platform 258 that controls the overall operation of the video conferencing server 250. The platform 258, when executed by the processor 252, implements a video conferencing service. The platform 258 stores in the memory a unique identifier for each user of the video conferencing service and manages the unique identifier or each user of the video conferencing service. The unique identifier for a user may be a username or an email address of the user. A password may also be associated with the unique identifier for a user and stored in the memory 254.

The network interface 256 may include one or more radios configured for wireless communications with the communication network 106, or one or more network adaptors configured for wired communications with the communication network 106. In general, the network interface 256 is configured to correspond with the network architecture of that is used to implement a link for communications between the video conferencing server 250 and the communication network 106.

It is to be noted that the server 250 is shown as a standalone computer. However, the implementation of various other embodiments of the present disclosure may include any client-server model where client devices may run a client version of the video conferencing system software. Other examples of the server 250 may include a distributed computing system that runs the server version of the video conferencing system software, a virtual machine (or virtual machines) instantiated by the infrastructure of a public or private cloud, or a cloud service provider that provides the video conference system software as a service (SaaS). Such implementations or any other similar implementation should not limit the scope of present disclosure.

Returning to FIG. 1, the client device 112 associated with the presenter 110 will be referred to herein, as presenter client device 112 and the client devices 112 associated with the participants 120 will be referred to herein, as participant client devices 112. In certain non-limiting embodiments, the presenter client device 112 and each of the participant client devices 112 may be configured to store and implement instructions associated with the video conference system software. In other words, the video conference system software may be installed on the presenter client device 112 and the participant client devices 112 to facilitate video conferencing between the presenter 112 and the participants 120. It to be noted that versions of video conference system software may vary from device to device. In particular, versions of video conference system software may depend upon the operating system associated with the presenter client device 112 and the participant client devices 112. For example, if operating system any of the presenter client device 112 and the participant client devices 112 is Android™, iOS™, Windows™ or the like then the video conference system software may be downloaded and installed from their respective application stores.

In other non-limiting embodiments, at least of the presenter client device 112 and the participant client devices 112 may use a web browser, such as, for example, Chrome™, Safari™, Mozilla™, or the like to facilitate video conferencing. It is to be noted that how the presenter client device 112 and the participant client devices 112 are configured to facilitate video conferencing should not limit the scope of the present disclosure by any means.

In certain non-limiting embodiments, the presenter client device 112 may be configured to send a video conference invitation associated with a future video conference to the participant client devices 112. Such video conference invitations may include a time, date, duration or any other information associated with the future video conference. In some embodiments, the presenter client device 112 may send the conference invitations using any suitable means such as, for example, electronic mails (emails), text messages or the like. In certain embodiments, the conference invitations may be password protected hyperlinks, i.e. the participant client devices 112 might require passwords to join the video conference. In other embodiments, the conference invitations may be open hyperlinks, i.e. any of the participant client devices 112 having access to the open web links may join the video conference.

In certain non-limiting embodiments, the presenter client device 112 may be located at a first location associated with the presenter 110 (e.g. office, home, or the like). Each of the participant client devices 112 may be located at different locations, such as, for example, the first participant client device 112 may be located at a second location associated with the first participant 120 (e.g. office, home, or the like), the second participant client device 112 may be located at a third location associated with the second participant 120 (e.g. office, home, or the like) and so on.

In certain non-limiting embodiments, the presenter client device 112 may be located at a first location associated with the presenter 110 (e.g. office, home, or the like). However, one or more of the participant client devices 112 may be located at a location common to more than one participant 120. For example, at least one participant client device 112 may be associated with at least two participants 120. In other examples, one or more of participant client devices 112 may be located at a same location such as a conference hall, a meeting hall or the like and that location may have at least two participants 120.

In accordance with non-limiting embodiments of the present disclosure, the presenter client device 112 may be configured to initiate a video conference between the presenter 110 and the participants 120 via the communication network 106. Once the video conference is initiated, the presenter client device 112 may be configured to communicate with the participant client devices 112.

In certain embodiments, the presenter client device 112 may share various sorts of presenter information 132 with the participant client devices 112. In certain embodiments, information sharing between the presenter client device 112 and the participant client devices 112 may be routed via the video conferencing server 250. Such presenter information 132 may include but not limited to a live video of the presenter 110 captured by the camera 216 associated with the presenter client device 112 (hereinafter referred to as presenter camera 216), audio/sound at the presenter 110 side captured by the microphone 212 associated with the presenter client device 112 (hereinafter referred to as presenter microphone 212), content (e.g. a slide of an MS PowerPoint™ presentation, a page of MS Word™ document, videos, images, pictures or the like) displayed in graphic user interface (GUI) 130 associated with the video conferencing system software on the display device 208 associated with the presenter client device 112 (hereinafter referred to as presenter display 208).

In certain embodiments, the participant client devices 112 may receive the presenter information 132 provided by the participant client devices 112. If the presenter information 132 includes the live video of the presenter 110 and/or content (e.g. a slide of a MS PowerPoint™ presentation, a page of a MS Word™ document, videos, images, pictures or the like) displayed on the presenter display 208, such presenter information 132 may be displayed on the display device 208 associated with the participant client device 112 (hereinafter referred to as participant display 208). If the presenter information 132 includes audio/sound at the presenter 110 side, the audio/sound may be produced by the speaker 214 associated with the participant client device 112 (hereinafter referred to as participant speaker 214).

It is to be noted that the GUI 130 associated with the video conferencing system software may provide the presenter 110 and the participants 120 with various options. In some non-exhaustive examples, the GUI 130 associated with the presenter client device 112 (hereinafter referred to as presenter GUI 130) may provide an option of selecting a particular content from the presenter client device 112 to be displayed on the presenter display 208. In another example, the presenter GUI 130 may provide an option of turning on or turning off various peripherals such as presenter microphone 212, presenter camera 216 or the like. In another example, the presenter GUI 130 may provide an option to add more participants 120 during an ongoing video conference. In another example, the presenter GUI 130 may provide an option to record the ongoing video conference save the recordings either locally on the presenter client device 112 or video conferencing server 250 or on some public or private cloud. In another example, the presenter GUI 130 may provide an option to schedule a video conference and send invitations to the participants 112. In another example, the presenter GUI 130 may provide an option to end or leave the video conference.

In another example, the presenter GUI 130 may provide an option to set various permissions for the participant client device 112 during the video conference. Such permissions may include if the GUI 130 associated with the participant client device 112 (hereinafter referred to as participant GUI 130) may share some content or not, add more participants 120 or not, record the video conference or not. It is to be noted that the participant GUI 130 may have similar options as that of the presenter GUI 130.

In another example, the presenter GUI 130 may provide a small window (e.g. a window that is small relative to the size of the presenter's display 208) to include a list of the participants 120 who have already joined the video conference, display video of at least one participant 120. It is to be noted that in certain embodiments, the small window may be hidden by default and may be displayed or popped up on the presenter display 208 based on certain actions performed the participant 110, such as, for example, selecting the small window by any suitable means. Some of the non-exhaustive reasons for hiding the small window may include the small window may require some display space on the presenter GUI 130, it may be difficult for the presenter 110 to notice and concentrate on the small window with increasing number of the participants 120, in some cases it might be difficult for the presenter 110 to concentrate on the presentation during the conference as some moving images may be disturbing and other similar reasons.

With this said, whenever required or otherwise the video conferencing system 100 may be configured to provide a non-obtrusive feedback to a presenter client device 112 during a video conference.

During the video conference (i.e. when a communication between the presenter client device 112 and the participant client devices 112 has already been established using the communication network 106 via the video conferencing server 250), the content (e.g. a slide of a MS PowerPoint™ presentation, a page of a MS Word™ document, videos, pictures or the like) to be shared may be displayed on the presenter display 208. In case the presenter 110 has enabled the presenter camera 216, the presenter camera 216 may capture a video (i.e. a series of images) of the presenter 110 (i.e. a live video), the presenter microphone 212 may capture the voice of the presenter 110 and any sound in the surroundings of the presenter 110 (hereinafter the voice of the presenter 110 together with any sound in the surroundings of the presenter 110 referred to as presenter audio/sound information).

In certain embodiments, the presenter client device 112 may be configured to send presenter information 132 to the video conferencing server 250. The presenter information 132 may include one or more of the content displayed on the presenter display 208, the captured series of images) of the presenter 110, and the presenter audio/sound information together. The video conferencing server 250 may be configured to send the presenter information 132 to the participant client devices 112. Any visual content (e.g. content displayed on the presenter display 112, the video (i.e. series of images) of the presenter 110) included in the presenter information 132 may be displayed on the participant displays 120 and any audible content in the presenter information 132 may be generated by the participant speakers 214.

In order to analyze attributes (e.g. body movement, facial expression, or the like) of the participants 120, the participant cameras 216 may capture a series of images (i.e. live video) of the participants 120 and the participant microphones 212 may capture the voice of the participants 120 and any sound in the surroundings of the participants 120 (hereinafter the voice of the participant 120 together with any sound in the surroundings of the participant 120 referred to as participant audio/sound information). In certain embodiments, the participant client devices 112 may be configured to send participant information 134 to the video conferencing server 250. The participant information 134 may include the captured series of images of the participants 120 (hereinafter also referred to as participant video information 134). The participant information 134 may also include the content displayed on the participant displays 208, and the participant audio/sound information.

It is to be contemplated that in certain embodiments, the participant information 134 may be associated with each individual participant 120 when all the participants 120 are located at different locations. In such embodiments, each participant client device 112 may be configured to send the corresponding participant information 134 to the video conferencing server 250. In certain embodiments in which more than one participant 120 may be located at the same location (e.g. a conference hall or a meeting hall or the like), in such cases the associated participant client device 112 may have one or more participant displays 208, one or more participant microphones 212, one or more participant speakers 214, and one or more cameras 216. In such embodiments, the associated participant client device 112 may compile the participant information 134 from one or more participant microphones 212 and one or more cameras 216 and send the corresponding participant information 134 to the video conferencing server 250.

As previously discussed, that the participant information 134 may include participant audio/sound information and participant video information. Some of the participant audio/sound information may be useful while some of the participant audio/sound information may be just noise. The useful audio/sound information may include questions, comments, suggestions, request to initiate discussion, clapping sound or the like associated with one or more participants 120. The useful participant audio/sound information may be directly related to the ongoing video conference. However, the participant audio/sound information that is noise may include coughing, sneezing, baby crying, dog barking, traffic sound, playing music/TV in the background, table knock, phone ringing, talking to someone else or any such sound associated with one or more participants 120 or generated in the surrounding environment of one or more participants 120 which are not directly related to the ongoing video conference may be treated as noise.

Similarly, some of the participant video information may be useful while some of the participant video information may be just noise. The useful participant video information may include body movement for example, gesture to get attention (raising hands, pointing or the like), gesture to express agreement or disagreement (e.g. by nodding heads), facial expressions indicative of the attention of the participants, such as, eye gaze, posture, unintentional body movement, or the like. All such useful participant video information may be in the series of images received by the video conferencing server 250 which are processed by the video conferencing server 250 to determine various attributes of the participants 120. The video conferencing server 250 may use the attributes to determine an indication about the participants 120. An indication may include but are not limited to if one or more participants 120 want to ask questions, if one or more participants 120 are attentive and understanding the presenter information 132, if one or more participants are getting sentimental or emotional about the presenter information 132, if one or more participants 120 are laughing and enjoying the presenter information 132, if one or more participants 120 are not attentive or lost interest in the presenter information 132 or the like.

However, the participant video information acting as noise may include for example if one or more participants 120 are eating and/or drinking, someone is moving around or someone crossed behind one or more participants 120, one or more participants are traveling and moving background is captured by one or more participants cameras 216. Such participant video information may not provide any useful information that may be directly or indirectly related to the ongoing video conference.

In order to determine various attributes (e.g. body movement including raising hands, waving hands, pointing hands applauding, facial expression, or the like) associated with the participants 120 in the participant information 134, in certain embodiments, the video conferencing server 250 may process the participant video information 134 (i.e. perform face detection and body detection on a series of images included in the participant information 134) using any suitable computer-vision technique as described below. In certain embodiments, the video conferencing server 250 may be configured to process participant audio/sound information included in the participant information 134.

As such, in certain embodiments, the memory 254 associated with the video conferencing server 250 may store instructions of video conference software to be executed by the processor 252 to perform the method of the present disclosure. In some embodiments, the instructions may include a trained neural network (i.e. a neural network that include parameters learned during training parameters) that receives a series of images and perform face detection, body detection, face tracking, and body tracking on the series of images.

In certain non-limiting embodiments, the video conferencing server 250 may be configured to perform face detection on the participant video information 134 to detect one or more faces in the participant video information 134, where each detected face corresponds to one participant 120 in the participant video information 134. Based on each face detected in the participant video information 134, the video conferencing server 250 may generate a bounding box for each respective detected face. Further, the video conferencing server 250 may be configured to perform face recognition on each respective detected face in the participant video information 134. Performing face recognition for each respective detected face includes monitoring changes in the bounding box generated for a respective face in the participant video information 134 to determine facial attributes for the respective detected face and analyzing the facial attributes for the respective detected face to infer (i.e. predict) a facial expression, emotion, or attention for the respective detected face. Examples of facial attributes include head pose, face landmark (e.g., forehead, lips, eyes), and eye gaze. Examples of facial expressions inferred (i.e. predicted) for a detected face (i.e. a participant 120 of the video conference) include laughing, smiling, nodding, examples of attention inferred (i.e. predicted) for a detected face include looking at the participant display, and examples of emotion inferred (i.e. predicted) for a detected face are having a serious expression.

In certain non-limiting embodiments, the video conferencing server 250 may also be configured to perform face landmark recognition to recognize face landmarks of a detected face, such as such as a forehand, eyes, and lips. Face landmark recognition includes detecting a face landmark (e.g., forehead, lip, eyes, etc.) in a detected face, generating a sub-bounding box for the detected face landmark, monitoring changes in the sub-bounding box generated for the face landmark to determine attributes of the face landmark, and analyzing the attributes of the face landmark to infer (i.e., predict) a facial landmark. Face landmark recognition generates information indicative of a type of facial landmark recognized.

In certain non-limiting embodiments, prior to performing face recognition, the video conferencing server 250 crops the participant video information 134 to generate new participant video information 134 that includes only a portion of the participant video information that corresponds to the bounding box generated for a detected face. In other words, each image in the series of images that forms the participant video information 134 is cropped to include a portion of the image that corresponds to the bounding box generated for a detected face. In this embodiment, the video conferencing server 250 is configured to perform face recognition on the new participant video information 134. Performing face recognition on the new participant video information 134 includes monitoring changes in new participant information to determine facial attributes for the detected face and analyzing the facial attributes for the detected face to infer (i.e. predict) a facial expression, emotion, or attention for the detected face.

In some of the non-exhaustive example embodiments, the video conferencing server 250 may be configured to compute a number of the participants 120 looking at the screen by analyzing the recognized facial attributes of each face (i.e. each participant 120) detected in the video participant information 134. In another example embodiment, the video conferencing server 250 may analyze the facial expressions inferred for each detected face (i.e. each participant 120) to determine an overall attention level for the participants 120. In particular, by, the video conferencing server 250 may determine the number of the participants 120 having a particular facial expression (e.g. laughing, smiling, having serious expressions, feeling bored or the like).

In certain non-limiting embodiments, the video conferencing server 250 may be configured to perform body detection on the participant video information 134 to detect one or more bodies in the participant video information 134, where each detected body corresponds to one participant 120 in the participant video information 134. Based on each body detected in the participant video information 134, the video conferencing server 250 may generate a bounding box for each detected body. The video conferencing server 250 may be configured to perform body movement recognition (otherwise known as gesture recognition) on the participant video information 134 to infer (i.e. predict) a body movement (otherwise known as a gesture) for each detected body. Body movement recognition for each respective detected body includes monitoring changes in the bounding box generated for a respective detected body (or body part) in the participant video information 134 to determine body movement attributes for the respective detected body and analyzing the body movement attributes for the respective detected body (or body part) to infer (i.e. predict) a body movement (otherwise known as a gesture) of the detected body. Body movement attributes include speed of movement of the body (or speed of movement of a part of the body ("body part"), such as a hand, arm, leg, etc.), duration of the movement of the body (or duration of movement of a part of the body), intensity of the movement of the body (or intensity of the movement of the body part), and a relative range of the movement of the body (or elative range of the movement of the body part). Body movements (e.g. gestures) inferred (i.e. predicted) by the video conferencing server 250 may include head nodding, head tilting, raising hands, waving hands, pointing hands applauding, and the like.

In certain non-limiting embodiments, prior to performing body movement recognition, the video conferencing server 250 crops the participant video information 134 to generate new participant video information 134 that includes only a portion of the participant video information 134 that corresponds to the bounding box generated for a detected body. In other words, each image in the series of images that forms the participant video information 134 is cropped to include a portion of the image that corresponds to the bounding box generated for a detected body. In this embodiment, the video conferencing server 250 is configured to perform body movement recognition on the new participant video information 134. Performing body movement recognition on the new participant video information 134 includes monitoring changes in new participant video information 134 to determine body movement attributes for the detected body and analyzing the body movement attributes for the detected body to infer (i.e. predict) a body movement (gesture) for the detected body.

In some of the non-exhaustive examples, the video conferencing server 250 may compute a number of the participants 120 raising their hands to ask questions, waving, their hands to get the attention of the presenter 110, applauding and the like based on the recognized body movement (e.g. gesture). In certain embodiments, to correctly infer (e.g. predict) a body movement (e.g. gesture), the video conferencing server 250 may analyze the body movement attributes of speed, duration, and intensity of the movement. For example, if one of the participants 120 move his/her hand for some other action, such as for picking up a pen, and quickly return his hand to the original position or any other position than being raised, the video conferencing server 250 may not recognize this movement as being a hand raised by the participant 120. In another example, the video conferencing server 250 may analyze speed of movement of the body (or a body part), such as speed with which the participant 120 is waving his/her hands.

In certain non-limiting embodiments, each respective participant client device 112 may perform face detection, face landmark detection, and face recognition to recognize facial attributes of each detected face in the participant information 134. In these embodiments, each participant client device 112 transmits facial expressions, recognized for each detected face to the video conferencing server 250 which analyzes the facial attributes for each respective detected face and infers (i.e. predicts) a facial expression, emotion, or attention of the each respective detected face. By performing face detection, face landmark detection, and face recognition at each participant client device 112, the amount of data transmitted between each client participant client device 112 and the video conferencing server 250 is significantly reduce because the participant video information 134 is not transmitted to the video conferencing server 250.

In certain non-limiting embodiments, each respective participant client device 112 may perform body detection and body movement recognition (e.g. gesture recognition) to recognize body movement attributes of each detected body in the participant information 134. In these embodiments, each participant client device 112 transmits body movement inferred (i.e. predicted) recognized for each detected body to the video conferencing server 250 which performs body movement recognition (e.g. gesture recognition) using the body movement attributes for each respective detected body to identify a body movement (e.g. gesture) of each respective detected body. By performing body detection and body movement recognition at each participant client device 112, the amount of data transmitted between each participant client device 112 and the video conferencing server 250 is significantly reduce because the participant video information 134 is not transmitted to the video conferencing server 250.

In certain non-limiting embodiments, the video conferencing server 250 may be configured to filter out the participant video information 134 acting as noise in the participant video information 134. By way of example, if one or more participants 120 are eating and/or drinking, someone is moving around or someone crossed behind one or more participants 120, one or more participants are traveling and moving background is captured by one or more participants cameras 216, such portion of the participant video information may not provide any useful information that may be directly or indirectly related to the ongoing video conference. The video conferencing server 250 may be configured to remove such portion of the participant video information 134.

In certain non-limiting embodiments, the video conferencing server 250 may be configured to process participant audio/sound information present in the participant information 134. In some of the non-exhaustive examples, the video conferencing server 250 may analyze the participant audio/sound information to determine if the participants 120 are applauding or one or more of the participants 120 are asking questions. In certain non-limiting embodiments, the video conferencing server 250 may be configured to filter out some of participant audio/sound information that is acting as noise in the participant information 134. For example, the video conferencing server 250 may filter out a part of the of participant audio/sound information including coughing, sneezing, baby crying, dog barking, traffic sound, playing music/TV in the background, table knock, phone ringing, talking to someone else or any such sound associated with one or more participants 120 or generated in the surrounding environment of one or more participants 120 which may not be directly related to the ongoing video conference.

It is to be noted that in certain embodiments, the video conferencing server 250 may use any suitable audio processing techniques to process the audio/sound included in participant information 134. How the participant information 134 is processed should not limit the scope of the present disclosure. Further, in above examples, the participant information 134 is being processed by the video conferencing server 250. However, in certain embodiments, the participant information 134 may be processed locally at the participant client devices 112 and the resultant information may be forwarded to the video conferencing server 250 for further processing.

Once, the participant information 134 is processed, the video conferencing server 250 may be configured to aggregate the processed participant information 134. By way of non-exhaustive examples, during the ongoing video conference, in response to the presenter 110 presenting the presenter information 132, the participants 120 may applaud. In another example, in response to the presenter 110 presenting the presenter information 132, one or more of the participants 120 may raise their hands or wave their hands to ask questions. In process of aggregating the processed participant information 134, the video conferencing server 250 may keep a record of a type facial expressions or body movements of the participants 120. Such record may include but not limited to a number of participants 120 applauded, a number of participants 120 raised their hands along with which particular participants 120 have raised their hands and the like.

As previously discussed, during the ongoing video conference it may be difficult for the presenter 110 to keep track of the response of the participants 120. This problem becomes more severe with increasing number of participants 120. To this end, in certain embodiments, the memory 254 may store a plurality of ambient graphics corresponding to the type of facial expressions or body movements of the participants 120 recorded. In certain embodiments, the processor 252 may be configured to generate the plurality of ambient graphics and store in the notifications in the memory 254.

The term "ambient graphic", as used herein, may refer to any visual content (such as, for example, image, a series of images, video, animation, or a combination thereof) that, when displayed on a display (e.g. the presenter display 208 and the participant display 208), may not fully obscure any part of the original content that is being displayed on the display. In certain embodiments, the ambient graphics may be semitransparent. The term "semitransparent" as used herein refers to partially or somewhat transparent or may be translucent. In other words, if the ambient graphic is overlaid over some digital content such as, for example, content being displayed in the presenter GUI 130 on the presenter display 208, both the ambient graphic and displayed content may be simultaneously visible to the presenter 110.

Figure 3:
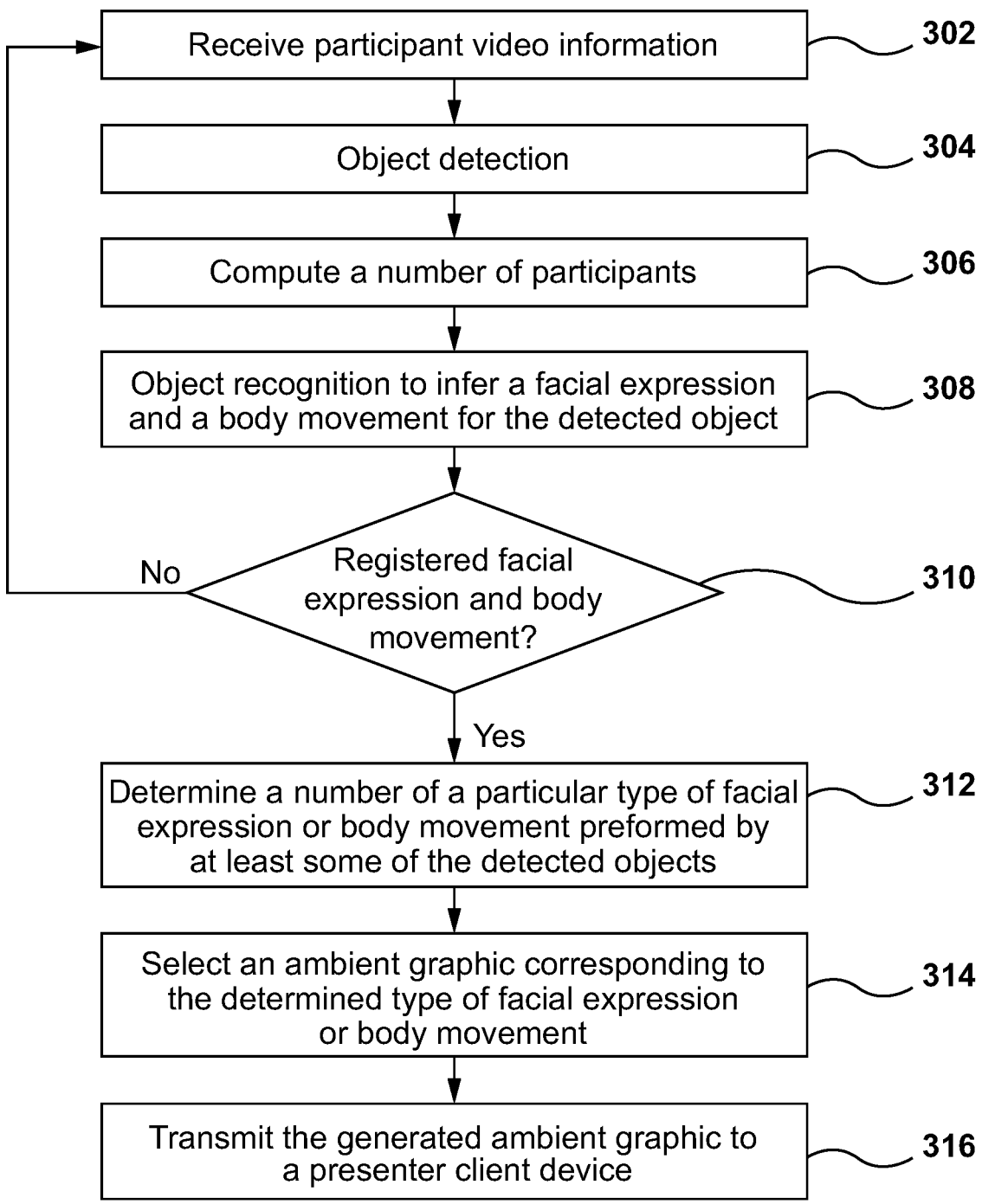
FIG. 3 depicts flowchart representing a process directed to a method implemented on the video conferencing system for video conferencing, in accordance with various embodiments of the present disclosure.

FIG. 3 depicts flowchart representing a process 300 directed to a method implemented on the video conferencing system 100 for video conferencing, in accordance with various embodiments of the present disclosure. When describing the process 300, reference will also be made to FIG. 1.

In certain embodiment, the process 300 is performed by the video conferencing server 250 of the video conferencing system 100. In particular, a non-transitory storage medium (e.g. memory 254) associated with the video conferencing server 250 stores instructions executable by the processor 252 to execute the process 300.

The process 300 begins at step 302, where the video conferencing server 250 receives participant video information 134. As previously discussed, the participant video information 134 includes the captured series of images of the participants 120.

The process 300 advances to step 304. At step 304, the video conferencing server 250 performs object detection (e.g. face detection or body detection) on the participant video information 134 to detect each object (e.g. face or body) in the participant video information 134 and generate a bounding box for each object detected in the participant video information 134. Each detected object (e.g. face or body) corresponds to one participant 120 in the participant video information 134 and may be tagged with a unique identifier identifying the detected object (e.g. face or body) of participant 120.

The process 300 proceeds to step 306. At step 306, the video conferencing server 250 computes a number of the participants 120 attending the video conference based on the number of detected objects (e.g. faces or bodies) detected in the participant video information 134.

The process 300 proceeds to step 308. At step 308, the video conferencing server 250, for each detected object, performs object recognition to infer (i.e. predict) a facial expression for the detected object, a body movement, or both for the detected object. For example, the video conferencing server 250, for each detected object, may identify a facial expression for the detected object. The video conferencing server 250 may also, for each detected object, infer (i.e. predict) a body movement for a detected object, such as head nodding, head tilting, raising hands, waving hands, pointing hands, applauding, changing posture while sitting or standing, random movement of hands, random movement of shoulders, random movement neck, changing position or any other body movement.

The process 300 proceeds to step 310. At step 310, the video conferencing processor 250 determines if the facial expression or the body movement inferred (i.e. predicted) at step 308 for each detected object is a registered facial expression or body movement or not. In certain embodiments, the video conferencing server 250 may have a record of type of registered facial expression or body movement in the memory 254. Such record may include particular type of facial expression or body movement a participant 120 may perform in some context associated with the video conference. For example, if a participant 120 wants to grab the attention of the presenter 110, then the associated record of type of registered body movement may include raising hands, waving hands, pointing hands or the like. On the other hand, if a participant 120 wants to acknowledge some context of the video conference, the record of type of registered body movement may further including applauding, head nodding or the like.

It is to be noted that the above stated examples included in the record of type of registered body movements may be non-exhaustive and may include any suitable body movement without limiting the scope of present disclosure. If the facial expression or body movement inferred for any of the detected objects at step 308 is a registered facial expression or body movement, the process 300 advances to step 312. Else, if the facial expression or body movement for each detected object is not a registered facial expression or body movement, the process 300 returns to step 302 where the video conferencing server 250 receives new participant video information 134. In certain embodiments, the facial expression or the body movement for a detected object corresponding to a particular participant 120 which is not in the record of type of registered facial expression or body movements may be filtered out by the video conferencing server 250.

After determining at step 310 that the facial expressions or body movements for at least some of the detected objects (e.g. one of participants 120) are registered facial expression or body movements, the process 300 proceeds to step 312. At step 312, the video conferencing server 250 determines a number of a particular type of facial expression or body movement performed by at least some of the detected objects (e.g. one or more of participants 120). For example, the video conference server 250 may determine that number of participants 120 nodding or the number of participants 120 who have raised their hands or the like.

The process 300 proceeds to step 314, where the video conferencing server 250 selects an ambient graphic corresponding to the determined type of facial expression or body movement. In certain embodiments, the memory 254 may store a plurality of ambient graphics with each ambient graphic corresponding to the different type of facial expression or body movement.

Figure 4A:
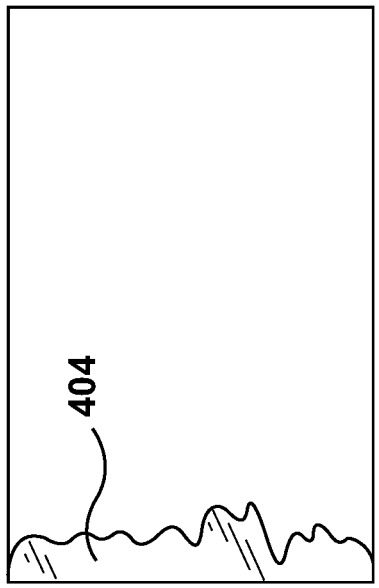
FIGS. 4A-4D depict examples of ambient graphics, in accordance with various embodiments of the present disclosure.
Figure 4B:
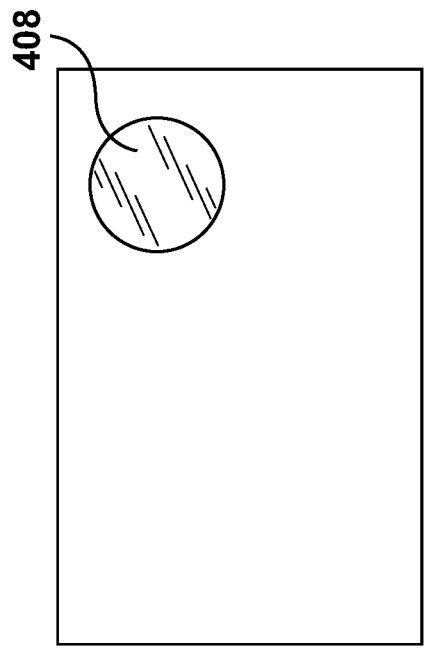
Figure 4C:
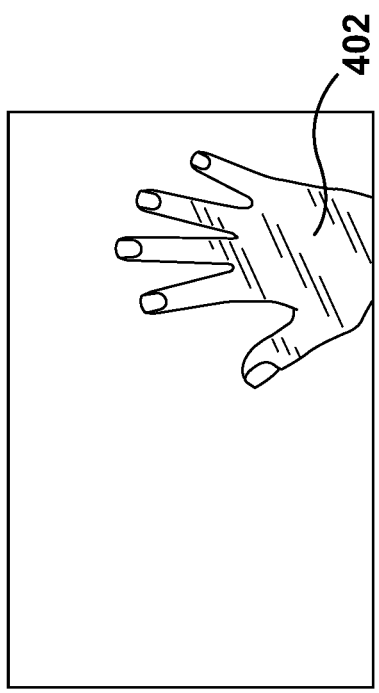
Figure 4D:
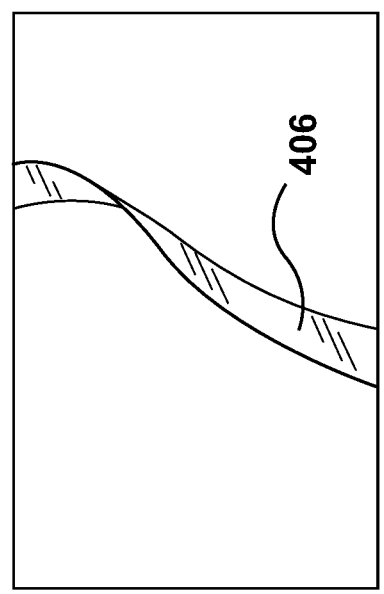

FIGS. 4A-4D depict examples of ambient graphics, in accordance with various embodiments of the present disclosure. It should be understood that the examples provided in FIGS. 4A-4D are non-limiting and other examples of ambient graphic may be implemented. In particular, FIG. 4A depicts an ambient hand silhouette 402, FIG. 4B depicts an ambient ripple 404, FIG. 4C depicts a flowing smoke image 406 as the ambient graphic, and FIG. 4D depicts a semi-transparent popping bubble image 408 as the ambient graphic.

Returning to FIG. 3, finally at step 316, the video conferencing server 250 transmits the selected ambient graphic (e.g. 402, 404, or the like) to the presenter client device 112. In certain embodiments, the video conferencing server 250 may render the transmitted ambient graphic with the content (e.g. a slide of a MS PowerPoint™ presentation, a page of a MS Word™ document, videos, images, pictures or the like) currently being displayed on the presenter display 208. By way of example, if one or more participants 120 raise their hands to ask questions, the video conferencing server 250 may select the ambient hand silhouette 402 and render the ambient hand silhouette 402 with the content currently being displayed on the presenter display 208.

In certain embodiments, the video conferencing server 250 may render the transmitted ambient graphic with the presenter GUI 130 on the presenter display 208. By way of example, if one or more participants 120 are applauding, the video conferencing server 250 may select the ambient ripples 404 and render the ambient ripples 404 with the presenter GUI 130 displayed on the presenter display 208. In certain embodiments, the video conferencing server 250 may also transmit the selected ambient graphic to the participant client devices 112 and render on the participants display in a similar manner as being rendered on the presenter display 208.

In certain embodiments, instead of transmitting the ambient graphics towards the presenter client device 112 and participant client devices 112, the video conferencing server 250 may send a notification to the video conference system software installed on the presenter client device 112 and participant client devices 112. In so doing, the presenter client device 112 and participant client devices 112 may be configured to generate the corresponding ambient graphics (e.g. 402, 404, or the like) locally and render the ambient graphics in a similar manner as discussed above.

It is to be noted that the ambient graphic (e.g. 402) may overlay the current content being displayed on the presenter display 208 in such a manner that the ambient graphic (e.g. 402) may completely or partially cover the content being displayed. Also, the ambient graphic (e.g. 402) and the portion of the content overlaid by the ambient graphic (e.g. 402) may be discernible and visible on the presenter display 208. As such, the presenter 110 may still be able to see through the ambient graphic (e.g. 402) and discern the content displayed underneath the ambient graphic (e.g. 402).

It is to be noted that the ambient graphic (e.g. 402) may be overlaid on any part of the presenter display 208 and the participant displays 208.

Figure 5A:
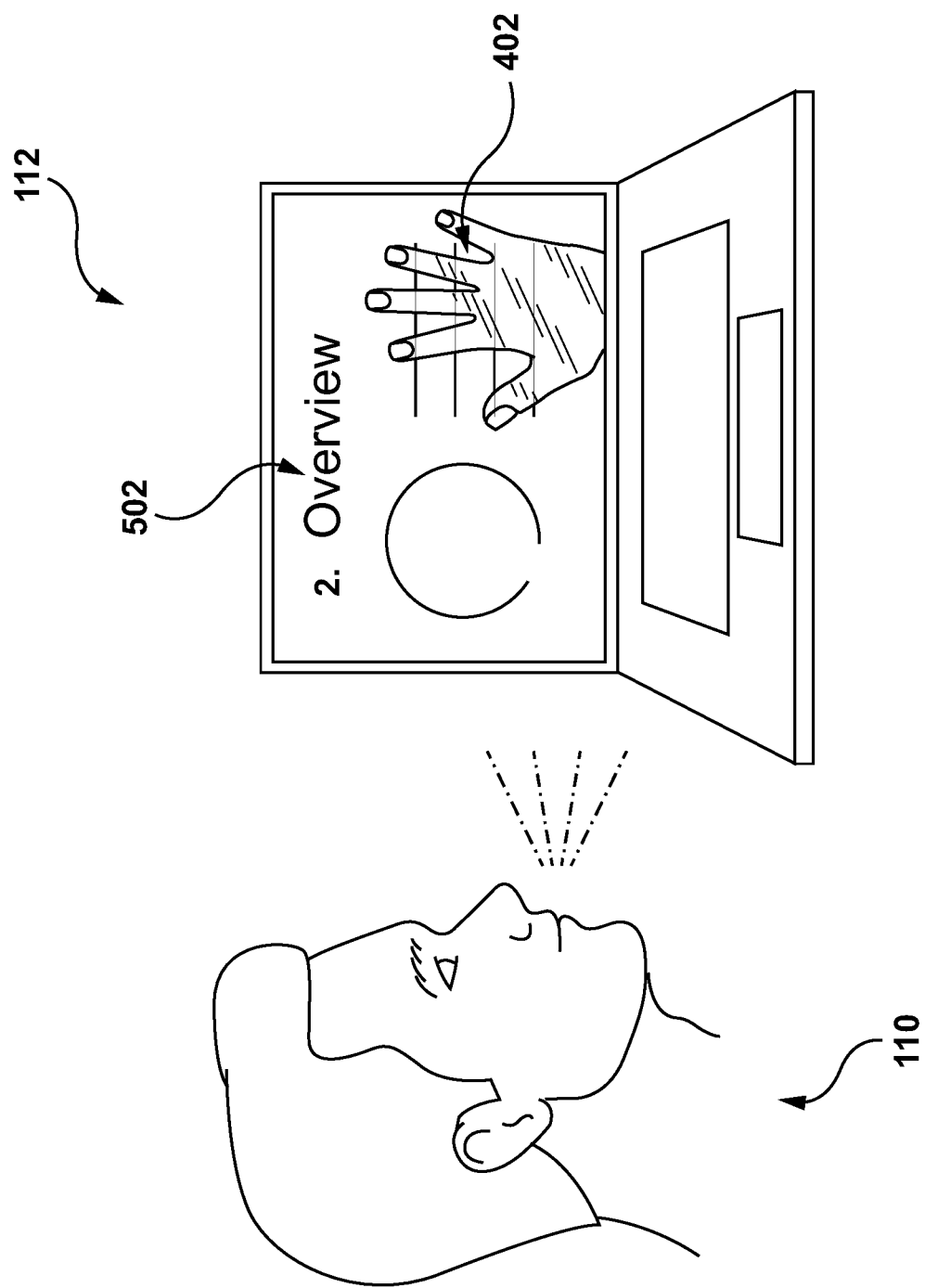
FIGS. 5A-5B depict non-limiting examples of the ambient graphics displayed on a presenter display, in accordance with various embodiment of the present disclosure.

FIG. 5A depicts a non-limiting example of the ambient graphic 402 displayed on the presenter display 208, in accordance with various embodiment of the present disclosure. As shown, the ambient graphic 402 may be overlaid with a current content 502 being displayed on the presenter display 208. In certain embodiments, the current content 502 may include at least one of a digital document (e.g. a slide of a MS PowerPoint™ presentation, a page of a MS Word™ document, videos, images, pictures or the like) stored in the storage 204 and/or memory 206 on the presenter client device 112 or a digital document accessed online. By way of example, the digital document accessed online may include a web page, a video file an audio file or the like.

The features of the current content 502 as well as the ambient graphic 402 are both rendered simultaneously on the presenter display 208. In so doing, the presenter 110 may become aware that at least one of the participants 120 has raised his/her hand and is willing to ask a question. Since the ambient graphic 402 may be overlaid over the current content 502 in such a manner that the presenter 110 can still see the current content 502 underneath the ambient graphic 402. It is to be noted that the ambient graphic 402 may be displayed anywhere on the presenter display 208.

In certain non-limiting embodiments, the presenter GUI 130 may provide an option that if the presenter 110 wants to take questions from the participants who have raised their hands, the presenter client device 112 may send a notification to the video conferencing server 250. In certain embodiments, such action may be triggered by the response of the presenter 110. Such response may include selecting a suitable option on the presenter GUI 130. The video conferencing server 250 may be configured to notify the respective participant client devices 112 associated with the participants 120 who have raised their hands that the presenter 110 is ready to take the question. The notifications used by the video conferencing may be the ambient graphics (e.g. 408). In so doing, the participant 110 may be notified about the actions of the participants 120 in such a manner that the current flow of the presentation that the participant 110 is presenting may not be affected.

In certain non-limiting embodiments, if the presenter 110 wants to take questions from the participants who have raised their hands and if more than one participants 120 located at the same location, the video conferencing server 250 may send instructions to the participant client device 112 to select the presenter camera 216 and the presenter microphone 212 nearest to the participant 120 who have raised his/her hand. To this end, the participant client device 112 may be configured to send audio and video information associated the participant 120 who have raised his/her hand to the participant client device 112 via the video conferencing server 250. At the same time, the presenter GUI 130 may provide an option to the presenter 110 to see the video and hear to the audio associated with the participant 120 who have raised his/her hand.

Figure 5B:
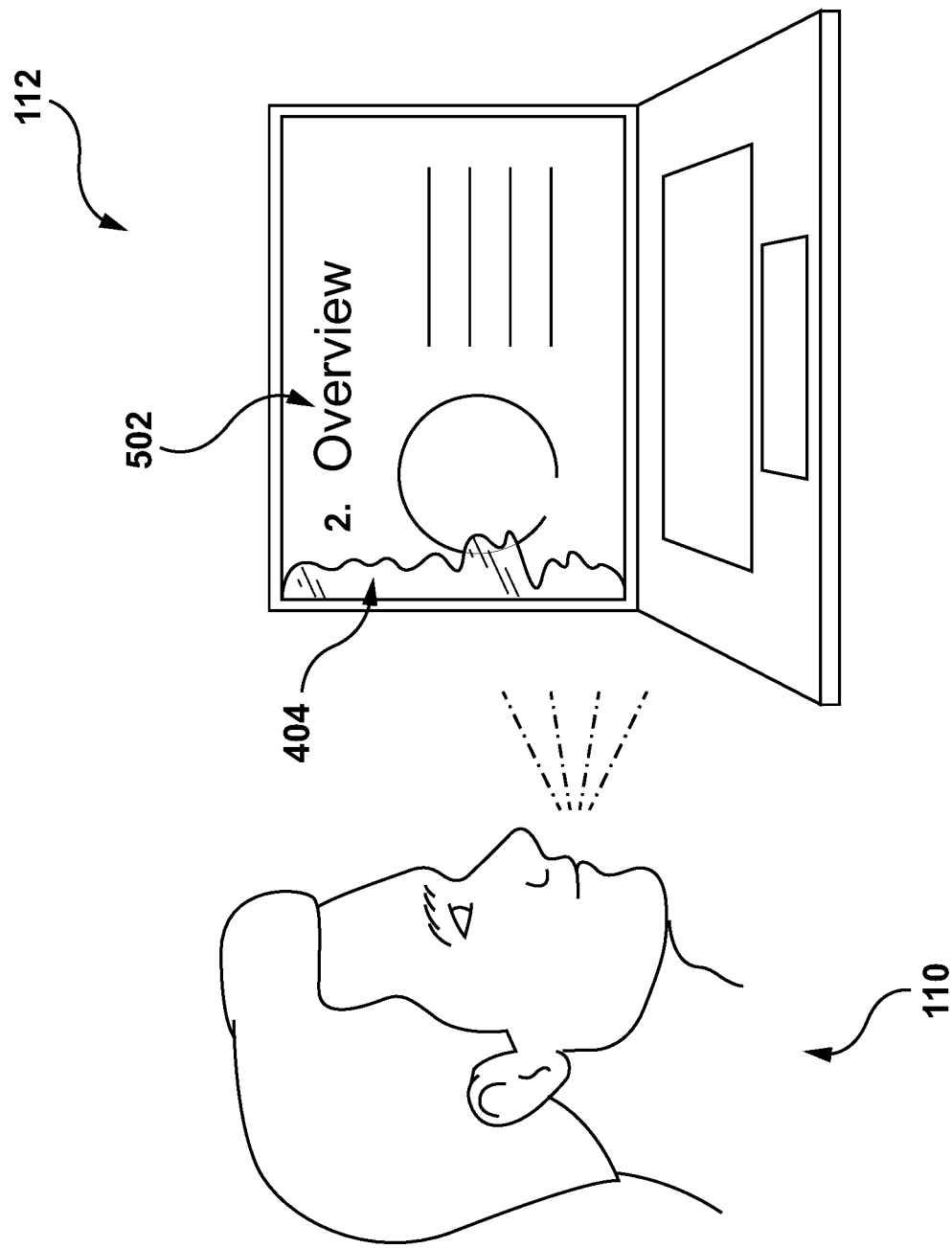

FIG. 5B depicts a non-limiting example of the side-displayed ambient graphic 404 displayed on the presenter display 208, in accordance with at least one embodiment of the present disclosure. A side-displayed ambient graphic in the form of ripples 404 may be provided on a side of the presenter display 208 as a result that the one or more of the participants 120 have been applauded. Such side-displayed ambient graphic is still semitransparent and may not obstruct the current content 502 displayed on the presenter display 208.

When displayed on the presenter display 208, the ambient graphic (e.g. 402, 404, 406, 408 or the like) may indicate to the presenter 110 that a facial expression or body movement has been performed by one or more participants 120. The type of facial expressions or body movements as determined by the video conferencing server 250 may determine the type of the ambient graphic to be displayed on the presenter display 208.

Returning to FIG. 1, in certain embodiments, the video conferencing server 250 may generate more than one ambient graphic at a time such that presenter display 208 may display multiple ambient graphics simultaneously.

In certain embodiments, both the presenter client device 112 and participant client devices 112 may receive the ambient graphics. In other embodiments, only the presenter client device 112 may receive the ambient graphics from the video conferencing server 250.

In certain embodiments, the presenter 110 may become the participant 120, and any one of the participants 120 may become the presenter 110. In so doing, the presenter client device 112 may become the participant client device 112 and the participant client device 112 may become the presenter client device 112. One non-limiting example of such scenario may be the case when during the ongoing video conference, one of the participants 120 may want to share some content (e.g. a slide of a MS PowerPoint™ presentation, a page of a MS Word™ document, videos, images, pictures or the like) and the presenter 110 permits the participant 120 by selecting a suitable option on the presenter GUI 130.

The video conferencing system 100 described herein permits the participants 120 to manifest their intention to intervene with the presenter's 110 presentation by using body language, such as facial expressions or body movements, which may be captured by the participant cameras 216. The participants 120 may not need to physically touch any device by, for example, pressing a button, touching a key, clicking a computer mouse, etc.

It is contemplated that instead of sending the participant audio/sound information and participant video information in the participant information 134 to the presenter client device 112, the video conferencing server 250 may determine, from the participant information 134, the type of facial expressions or body movements performed by the participants 120. In certain embodiments, unless required or requested by the presenter client device 112, the audio and video data in the participant information 134 may not be transmitted from the participant client devices 112 or from the video conferencing server 250 towards the presenter client device 112.

Further, the video data in the participant information 134 may not be displayed on the presenter display 208. Rather, the participant information 134 may be analyzed by the video conferencing server 250 and may be "translated" into ambient graphics by the video conferencing server 250 or by the participant client devices 112 or by the presenter client device 112 or by the combination thereof. Ambient graphics may comprise a summary of the participant information 134. Therefore, such ambient graphics may be less distracting and disturbing to the presenter 110 and the participants 120.

Moreover, the video conferencing system 100 permits reducing an amount of data transmitted between the presenter client device 112 and the video conferencing server 250 and between the presenter client device 112 and the participant client devices 112. Transmitting and displaying ambient graphics on the presenter display 208 may be executed faster than transmitting and displaying the actual participant video from at least some of the participant client devices 112. Transmission of ambient graphic between the video conferencing server 250 and the presenter client device 112 may require less bandwidth as compared to the transmission of the actual participant video from at least some of the participant client devices 112.

Furthermore, when the ambient graphics are semitransparent, dimensions of the ambient graphics may be as large as the dimensions of the presenter display 208. Semitransparent ambient graphic may not obscure any part of the current content (e.g. 502) and both the current content (e.g. 502) and the ambient graphic may be discernible when the current content (e.g. 502) and the ambient graphic (e.g. 402) are rendered on the presenter display 208, even when the ambient graphic is as large as the presenter display 208.

Figure 6:
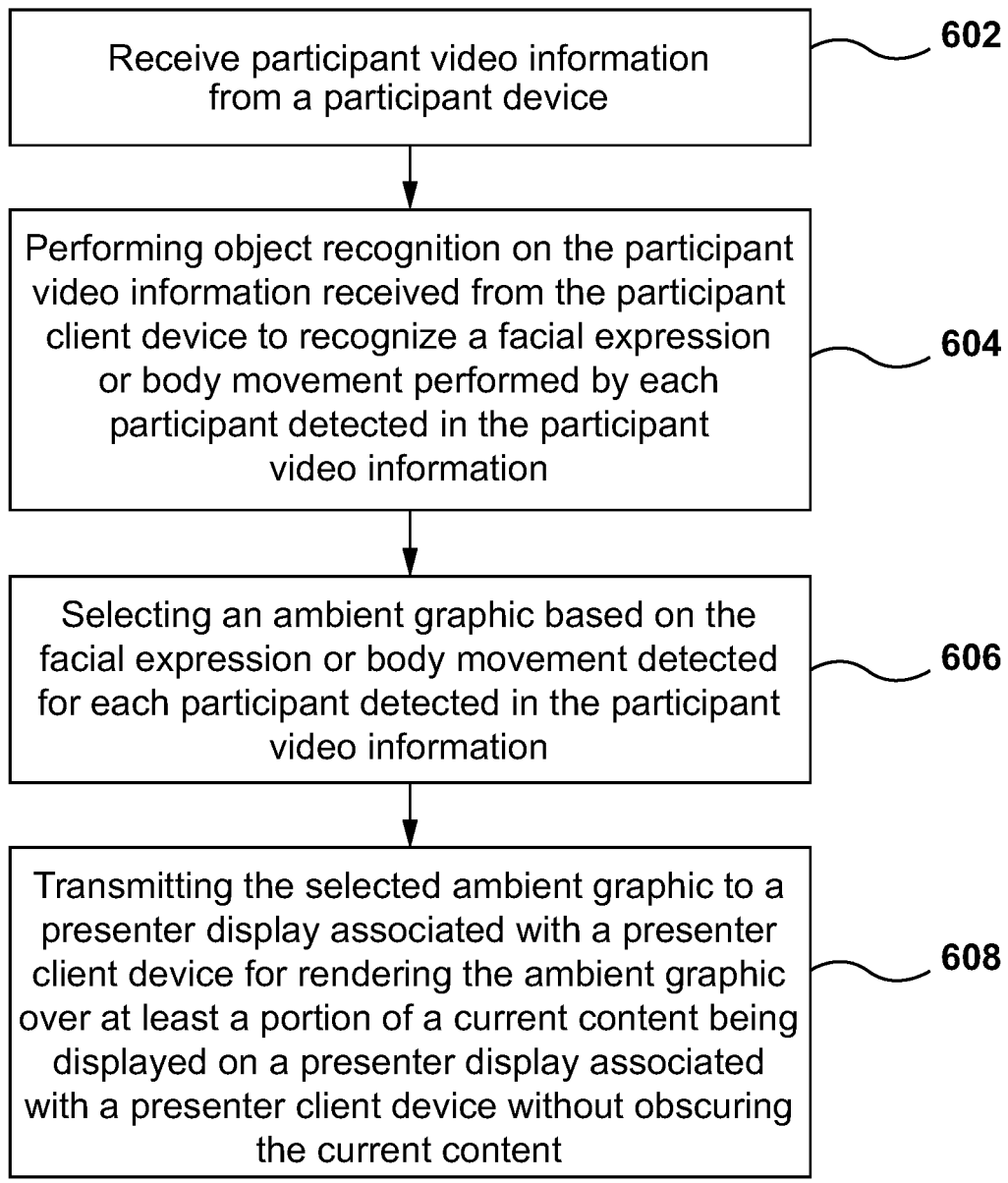
FIG. 6 depicts flowchart representing a process directed to a method implemented on the video conferencing system for video conferencing, in accordance with various embodiments of the present disclosure.

FIG. 6 depicts flowchart representing a process 600 directed to a method implemented on the video conferencing system 100 for video conferencing, in accordance with various embodiments of the present disclosure. When describing the process 600, reference will also be made to FIG. 1.

In certain embodiment, the process 600 is performed by the video conferencing server 250 of the video conferencing system 100. In particular, a non-transitory storage medium (e.g. memory 254) associated with the video conferencing server 250 stores instructions executable by the processor 252 to execute the process 600.

The process 600 begins at step 602, where the video conferencing server 250 receives participant video information from a participant client device. As previously noted, the video conferencing server 250 receives the participant information 134 from the participant client devices 112. The participant information 134 includes participant video information 134 associated with the participants 120.

The process 600 advances to step 604, where the video conferencing server 250 performs object recognition on the participant video information 134 received from the participant client device 112 to recognize a facial expression or body movement performed by each participant 120 detected in the participant video information 134. As previously noted, the video conferencing server 250 may identify at least one type of facial expression or body movement in the participant information 134. Such type of facial expression includes at least one of a laughing, smiling, nodding or the like and the body movement includes at least one of a head nodding, head tilting, raising hands, waving hands, pointing hands, applauding or the like.

The process 600 proceeds to step 606, where the video conferencing server 250 select an ambient graphic based on the facial expression or body movement detected for each participant 112 detected in the participant video information 134. As previously discussed, in response to recognizing at least one type of facial expression or body movement, the video conferencing server 250 may select an ambient graphic (e.g. 402, 404, 406, 408 or the like). In certain steps, if the identified body movement is raising hands, the video conferencing server 250 may select the ambient hand silhouette 402 as the ambient graphic.

Finally, the process 600 moves to step 608, where the video conferencing server 250 transmits the selected ambient graphic to a presenter display 208 associated with a presenter client device 112 for rendering the ambient graphic over at least a portion of a current content being displayed on a presenter display 208 associated with a presenter client device 112 without obscuring the current content. As previously discussed, the video conferencing server 250 transmits the selected ambient graphic (e.g. the ambient hand silhouette 402) to the presenter display 208 associated with the presenter client device 112 for rendering the ambient graphic (e.g. the ambient hand silhouette 402) over at least a portion of a current content (e.g. 502) being displayed on the presenter display 208 associated with a presenter client device 112 without obscuring the current content.

It is to be understood that the operations and functionality of the video conferencing system 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure

What is claimed is:

1. A video conferencing server comprising:
   a processor, and
   a non-transitory storage medium storing instructions to recognize facial expressions and body movements, the instructions being executable by the processor such that the video conferencing server is configured to:
   receive participant video information from a participant client device;
   generate a bounding box for each participant detected in the received participant video information;
   for each bounding box corresponding to a detected participant, perform object recognition on the bounding box to recognize a facial expression and a body movement of the detected participant;
   determine a number of similar facial expressions and/or similar body movements amongst the detected participants;
   provide a semi-transparent ambient graphic based on attributes of the recognized facial expression and body movement for each detected participant and the number of similar facial expressions and/or similar body movements amongst the detected participants; and
   transmit the ambient graphic to a presenter display associated with a presenter client device for rendering the ambient graphic configured to be overlaid over at least a portion of a current content being displayed on the presenter display without obscuring the current displayed content.

2. The video conferencing server of claim 1, further configured to:
   transmit the ambient graphic to a participant display associated with the participant client device for displaying the ambient graphic over at least a portion of a current content being displayed on the participant display.

3. The video conferencing server of claim 1, further configured to:
   receive participant video information from a second participant client device;
   generate a bounding box for each participant detected in the received second participant video information;
   for each bounding box corresponding to a detected participant of the second participant video information, perform object recognition on the bounding box to recognize a facial expression and a body movement of each detected participant of the second participant video information
   provide a semi-transparent ambient graphic representative of attributes of the recognized facial expression and/or body movement for each detected participant; and
   transmit the ambient graphic to the presenter display associated with the presenter client device for rendering the ambient graphic configured to be overlaid over at least a portion of the current content being displayed on the presenter display without obscuring the current content.

4. The video conferencing server of claim 3, further configured to:
   transmit the ambient graphic to a participant display associated with the second participant client device for displaying the ambient graphic over at least a portion of a current content being displayed on the participant display associated with the second participant client device.

5. The video conferencing server of claim 1, wherein, the participant information includes audio and video information associated with at least one participant, the video information is captured by an image sensor and the audio information is captured by a microphone.

6. The video conferencing server of claim 1, wherein the facial expression includes at least one of a laughing, smiling or nodding and the body movement includes at least one of a head nodding, head tilting, raising hands, waving hands, pointing hands or applauding.

7. The video conferencing server of claim 1, wherein providing the ambient graphic further includes generating the ambient graphic.

8. The video conferencing server of claim 1, wherein the current content includes at least one of a digital document stored on the presenter client device or a digital document accessed online.

9. A video conferencing method for a server to recognize facial expressions and body movements, the method comprising: receiving participant video information from a participant client device; generating a bounding box for each participant detected in the received participant video information; for each bounding box corresponding to a detected participant, performing object recognition on the bounding box to recognize a facial expression and body movement of each detected participant; determining a number of similar facial expressions and/or similar body movements amongst the detected participants; providing a semi-transparent ambient graphic representative of attributes of the recognized facial expression and/or body movement for each detected participant and the number of similar facial expressions and/or similar body movements amongst the detected participants; and transmitting the ambient graphic to a presenter display associated with a presenter client device for rendering the ambient graphic configured to be overlaid over at least a portion of a current content being displayed on the presenter display without obscuring the current displayed content.

10. The method of claim 9 further comprising transmitting the ambient graphic to a participant display associated with the participant client device for displaying the ambient graphic over at least a portion of a current content being displayed on the participant display associated with the participant client device.

11. The method of claim 9 further comprising:
receiving participant video information from a second participant client device;
generating a bounding box for each participant detected in the received second participant video information;
for each bounding box corresponding to a detected participant of the second participant video information, performing object recognition on the bounding box to recognize a facial expression and/or body movement of each detected participant of the second participant video information;
providing a semi-transparent ambient graphic representative of attributes of the recognized facial expression and/or body movement for each detected participant; and
transmitting the ambient graphic to the presenter display associated with the presenter client device for rendering the ambient graphic configured to be overlaid over at least a portion of the current content being displayed on the presenter display associated with the presenter client device without obscuring the current content.

12. The method of claim 11 further comprising transmitting the ambient graphic to a participant display associated with the second participant client device for displaying the ambient graphic over at least a portion of a current content being displayed on the participant display associated with the second participant client device.

13. The method of claim 9, wherein the participant information includes audio and video information associated with at least one participant and the video information is captured by an image sensor and the audio information is captured by a microphone.

14. The method of claim 9, wherein the facial expression includes at least one of a laughing, smiling or nodding and the body movement includes at least one of a head nodding, head tilting, raising hands, waving hands, pointing hands or applauding.

15. The method of claim 9, wherein the providing of the ambient graphic further includes generating the ambient graphic.

16. The method of claim 9, wherein the current content includes at least one of a digital document stored on the presenter client device or a digital document accessed online.

* * * * *